May 24, 1966 W. T. McLAUGHLIN ETAL 3,253,075
METHOD OF FACING CONCRETE PIPE
Filed Dec. 13, 1963 3 Sheets-Sheet 1
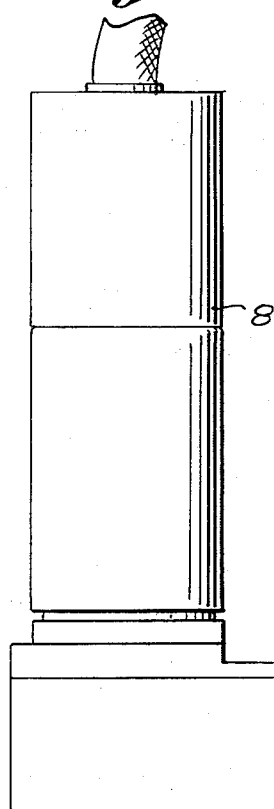
Fig. 1.
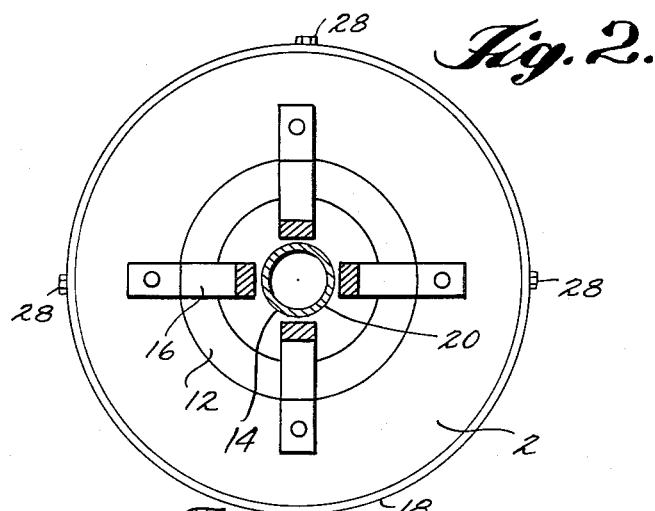
Fig. 2.
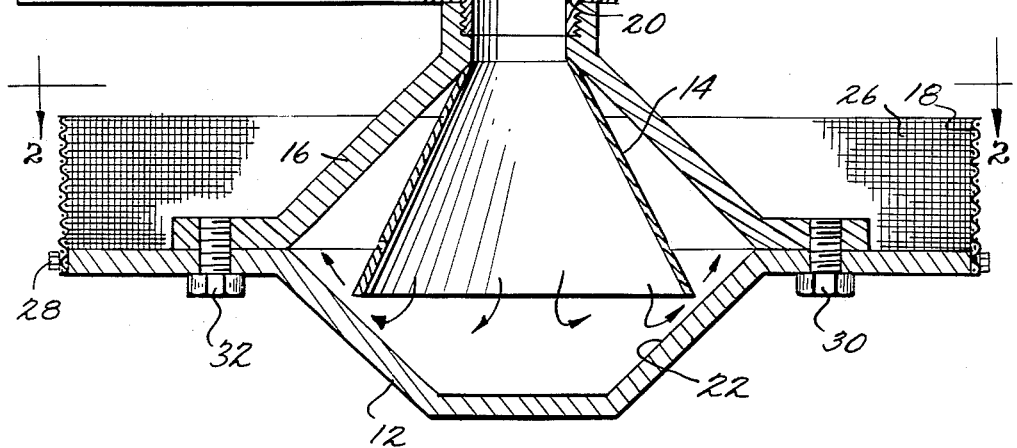
INVENTORS
WILLIAM T. McLAUGHLIN
BY JOHN V. CLANCY
Cushman, Darby & Cushman
ATTORNEYS May 24, 1966  W. T. McLAUGHLIN ETAL  3,253,075
METHOD OF FACING CONCRETE PIPE
Filed Dec. 13, 1963  3 Sheets-Sheet 2

INVENTORS
WILLIAM T. McLAUGHLIN
BY JOHN V. CLANCY
Cushman, Darby & Cushman
ATTORNEYS May 24, 1966  W. T. McLAUGHLIN ETAL  3,253,075
METHOD OF FACING CONCRETE PIPE
Filed Dec. 13, 1963  3 Sheets-Sheet 3

INVENTORS
WILLIAM T. McLAUGHLIN
JOHN V. CLANCY
BY Cushman, Darby & Cushman
ATTORNEYS United States Patent Office 3,253,075
Patented May 24, 1966

3,253,075
METHOD OF FACING CONCRETE PIPE
William T. McLaughlin and John V. Clancy, Pittsburgh, Pa., assignors, by mesne assignments, to United States Steel Corporation, Pittsburgh, Pa., a corporation of New Jersey
Filed Dec. 13, 1963, Ser. No. 330,416
4 Claims. (Cl. 264—270)

This invention relates to the preparation of an integral facing or barrier on the interior surface of concrete pipes.

Concrete pipes are frequently subjected to service conditions which cause attack on the inner surface of the pipe. Thus, hydrogen sulfide (and sulfuric acid formed therefrom) and other agents are released from water and sewage carried by such pipes. As a consequence, the art has turned to vitrified clay in place of concrete in making hydrogen sulfide resistant pipes. Unfortunately, vitrified clay is relatively expensive and does not have as good structural properties as desired, e.g., its compressive strength is not as high as desired.

Concrete pipes further suffer from the disadvantage of having rough, porous interior surfaces and of having inadequate abrasion resistance.

It is an object of the present invention to prepare a continuous, integral facing or barrier for the interior surface of concrete pipe.

Another object is to prepare such a facing which is resistant to physical and/or chemical agents which attack concrete itself either by corrosion or erosion.

A further object is to devise an economical way of applying a protective facing to the interior surface of wet or green concrete pipe.

An additional object is to develop an integral facing for the interior surface of concrete pipe to provide a product giving at least as good protection against hydrogen sulfide and sulfuric acid as vitrified clay and which gives a product structurally superior to vitrified clay, e.g., it has better compressive strength.

Yet another object is to impart an abrasion resistant, non-porous, smooth facing to the interior surface of concrete pipe.

It is another object to provide a barrier to bridge and seal cracks or other imperfections, thus giving maximum protection against infiltration or exfiltration.

A still further object is to develop a method of applying a facing to the interior surface of wet, uncured concrete pipe made by any of the conventional concrete pipe forming machines, e.g., horizontal centrifugal machines, vertical tamper machines and packer head machines.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by impinging a settable plastic composition onto the interior surface of a concrete pipe while the concrete is still in the wet, green or uncured stage. The pipe can be made by any conventional pipe forming machine, such as horizontal centrifugal machines, vertical tamper machines and packer head machines.

In one aspect of the invention coal tar pitch, epoxy resin and sand are premixed and charged into a cartridge which via a conduit feeds into a spinning disk. This assembly is lowered inside a wet, uncured concrete pipe. Material is extruded out of the cartridge onto the disk. Centrifugal force throws the material against the pipe wall as the assembly is gradually raised through the center of the stationary pipe. The facing or barrier is smooth.

There is a fusing or integration of the facing or barrier into the pipe itself.

The resulting product gives as good protection as vitrified clay and is structurally superior thereto. The conduit formed is not only resistant to hydrogen sulfide and sulfuric acid, but is abrasion resistant and presents a smoother surface than conventional concrete which has a rough texture.

Instead of utilizing a pitch-epoxy formulation, less preferably there can be employed an epoxy resin alone.

Surprisingly, it has been found that the epoxy resin mastic will bond to wet, uncured concrete.

The invention will be best understood in connection with the accompanying drawings wherein:

FIGURE 1 is a view, partially in section, of one form of apparatus for carrying out the invention;

FIGURE 2 is a view along the line 2—2 of FIGURE 1;

Figure 3:
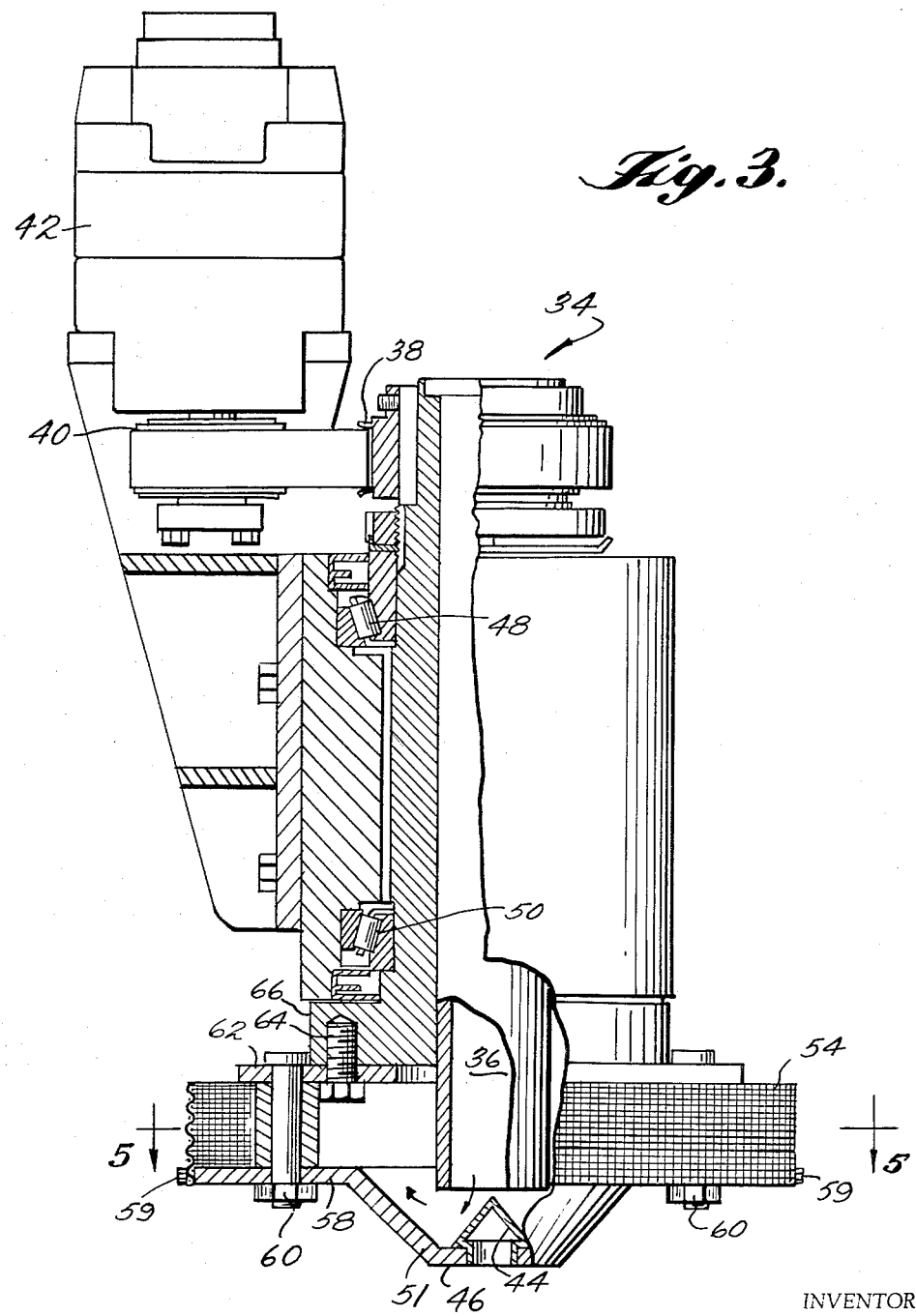
FIGURE 3 is a view, partially in section, of another form of apparatus for carrying out the invention.

Unless otherwise indicated, all parts and percentages are by weight.

In the illustrative examples described in connection with the drawings the settable plastic employed had the following composition:

Parts
Liquid bisphenol A-epichlorhydrin having an epoxy equivalent of about 200 and a molecular weight of about 400 _____ 2.50
Butyl glycidyl ether (to reduce the viscosity) ____ 0.13
Diethylene triamine (catalyst) _____ 0.20
Pitch-containing coal tar, specifically road tar 5 (RT–5) _____ 5.17
Sand (filler) all passed through 30 mesh and substantially all retained on 200 mesh (Tyler screen) 24.0

This composition is designated hereinafter as Composition A.

While Composition A was employed in the specific example described below, there can be employed in place of Composition A Composition B or C with equally effective results.

*Composition B*

Parts
Liquid bisphenol A-epichlorhydrin having an epoxy equivalent of about 200 and a molecular weight of about 400 _____ 2.63
Diethylene triamine (catalyst) _____ 0.20
Pitch-containing coal tar, specifically road tar 6 (RT–6) _____ 5.17
Sand (filler) all passed through 20 mesh and substantially all retained on 200 mesh (Tyler screen) 24.0

Composition C

| | Parts |
|---|---|
| Liquid bisphenol A-epichlorhydrin having an epoxy equivalent of about 250–280 and a molecular weight of about 500–560 | 2.50 |
| Butyl glycidyl ether (to reduce the viscosity) | 0.13 |
| Diethylene triamine (catalyst) | 0.20 |
| Pitch-containing coal tar, specifically road tar 6 (RT–6) | 5.17 |
| Sand (filler) all passed through 30 mesh and substantially all retained on 200 mesh (Tyler screen) | 24.0 |

Referring more specifically to FIGURES 1 and 2 of the drawings there is provided a boom 2 to which there is connected a gear box 4. The gears, such as gear 6, are driven by an air motor 8.

The boom 2 is positioned inside a wet, uncured, green, cylindrical concrete pipe. Through the center of the boom there is provided a conduit 10. Composition A is forced by pressure through conduit 10 into the cone 14 within the head 12 of the boom. The head 12 is connected to the drive shaft 20 by ribs 16.

By turning on the motor the entire head portion of the boom, including cone 14, is rotated rapidly, e.g., 2000 r.p.m. Composition A, as it emerges from the cone, escapes as indicated by the arrows and is broken up and flung back when it strikes the inner wall 22 of the head. The thus-dispersed Composition A is then forced through the apertures in the cylindrical screen 26. An annular plate is held by bolts 30 and 32 and, in turn, holds the screen 26 by screws 28. Composition A, when it is forced through the apertures, is impinged upon and impregnates the surface of the wet, green concrete pipe to form a facing layer which becomes smooth. It was observed that there was a distortion of the pipe surface due to the force of the impingement.

The boom is gradually retracted through the pipe so that the entire inner surface receives an integral facing of Composition A of uniform thickness. The treated pipe is placed in a steam curing chamber air cured for 3 hours and then put through the regular steam cure period, e.g., about 130° F. for 12 hours to cure both the concrete and the resin composition. (Alternatively, curing can be accomplished under normal atmospheric conditions in those geographic locations where high temperatures and humidity prevail, e.g., Houston, Texas.)

Figure 5:
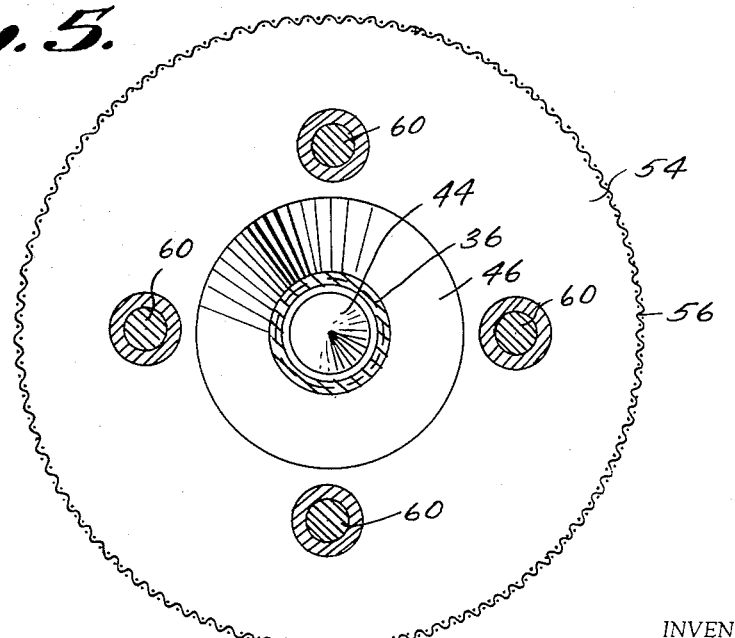
FIGURE 5 is a sectional view along the line 5—5 of FIGURE 3.

FIGURES 3 and 5 show another apparatus utilizing a boom 34. Through the conduit 36 in the boom, Composition A is forced under pressure. (Instead of using a single conduit 36, it is possible to employ two concentric conduits with the sand passing through one conduit and the balance of Composition A through the other.) On the boom there is provided a gear box 38, the gears of which are driven by pulley 40 which, in turn, is connected to hydraulic motor 42.

Composition A is forced by pressure through conduit 36 against the inverted V-portion 44 of the front end 46 of the head of the boom. When the motor is on, the entire lower section of the boom, including head 46, rotates rapidly, e.g., 2800 r.p.m., on bearings 48 and 50. Composition A, as it hits the V-portion 44, is broken up and dispersed tangentially along the frusto-conical wall 51 of the head of the boom in the direction shown by the arrows, and is forced through the apertures in the cylindrical screen 54 having a surface 56. Annular plate portion 58 of the head 46 is held by bolts 60 and, in turn, holds the screen 54 by screws 59. The bolts 60 also secure the head 46 to a collar 62 which, in turn, is secured by bolts 64 to the lead portion 66 of the rotating shaft. The boom is retracted through the pipe in the manner previously described.

As the Composition A is forced through the screen by centrifugal force, it impregnates the surface of the wet, uncured, green concrete pipe, e.g., a 24 inch diameter pipe, to form a facing layer. The pipe can be cured and the resin set in the manner previously set forth.

In the specific examples described in connection with FIGURE 3, the energy of the particles leaving the screen was 6.5 ft. lbs. per square inch of surface.

Sufficient energy must be imparted to the particles so that they strike the concrete surface with sufficient force to avoid air entrapment and to obtain penetration of the surface of the interior wall of the concrete pipe.

The apparatus described in either FIGURE 1 or FIGURE 3 has been found to be adequate to impart the desired force.

Instead of rapidly rotating the head of the boom and thus using centrifugal force to aid in lining or facing the pipe wall, the required force can be obtained by employing a fixed conduit on the boom through which the epoxy mastic composition is impelled as a jet with the requisite force at the interior pipe wall and the pipe can be rotated to insure a smooth, uniform coverage and the impregnation of the pipe wall while the boom is gradually retracted.

Figure 4:
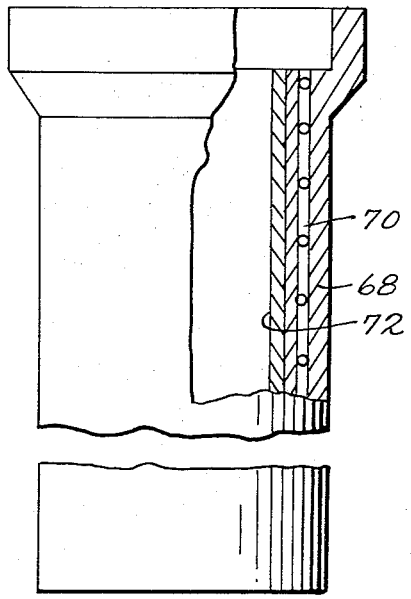
FIGURE 4 shows a concrete pipe having a facing or barrier prepared according to the invention and prior to curing.

As shown in FIGURE 4, the resultant green, uncured concrete pipe 68 has a steel wire reinforcement cage 70 therein and an inner, integral, continuous facing layer 72 of pitch-epoxy resin.

Figure 6:
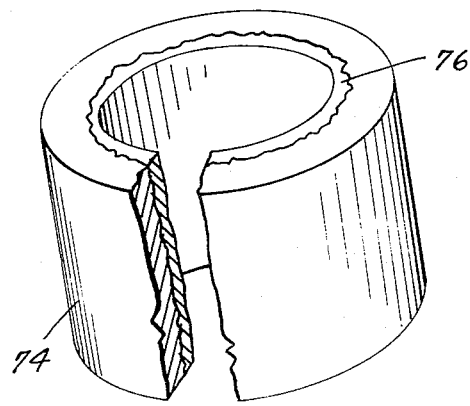
FIGURE 6 is a fractional perspective view, partially broken away and in section, showing a cured concrete pipe having an integral, continuous interior facing according to the invention.

FIGURE 6 shows a cured concrete pipe 74 having an interior facing layer 76 of cured epoxy resin. It will be noted as stated that the facing layer impregnates the porous surface of the concrete, is securely locked therein and presents an impervious, continuous surface to the contents of the pipe, e.g., sewage containing hydrogen sulfide.

The epoxy resins which can be used include the epoxy ether resins having a 1,2-epoxy equivalency of greater than 1, such as the reaction products of polyhydric alcohols or polyhydric phenols with epichlorhydrin or glycerol chlorhydrin. Examples of such resins are the polyglycidyl ethers of resorcinol, catechol, hydroquinone, bis-(4-hydroxyphenyl)-2,2-propane (bis-phenol A). 4,4'-dihydroxy-benzophenone, bis - (4-hydroxyphenyl) - 1,1-ethane, tetrakis (4-hydroxyphenyl)ethane, bis - (4 - hydroxyphenyl)-1,1-isobutane, bis-(4-hydroxyphenyl)-2,2-butane, bis-(4-hydroxy-2-methylphenyl)-2,2-propane, bis - (4-hydroxy-2-t-butylphenyl)-2,2-propane, bis - (2-hydroxynaphthyl)-methane, 1,5-dihydroxynaphthalene, ethylene glycol, propylene glycol, trimethylene glycol, diethylene glycol, triethylene glycol, glycerol, dipropylene glycol, diglycerol, erythritol, mannitol, sorbitol, polyallyl alcohol, polyvinyl alcohol, novolak resins, e.g., the novolak from 4 moles of phenol and 3 moles of formaldehyde, as well as other novolaks having 3 to 7 phenolic nuclei, phloroglucinol, 2,4,4'-trihydroxy, diphenyl dimethyl methane, 4,4' - dihydroxydiphenyl sulfone, 4,4' - dihydroxybiphenyl, polymeric butadiene dioxide, diglycidyl ether, allyl glycidyl ether, glycidyl methacrylate, glycidyl ester of trimerized linoleic acid, diglycidyl ester of dimerized linoleic acid, Oxiron 2000 (an epoxidized polybutadiene-partially hydrolyzed vinyl acetate copolymer having a viscosity of 1800 poises, an epoxy equivalency of 177, having 2.5% hydroxyl and an iodine number of 185).

While straight epoxy resins can be employed, preferably the epoxy resins are modified with a bituminous material, most preferably, a coal tar pitch-containing material. The bituminous materials include coal tar pitch, refined coal tar, coal tar (which contains coal tar pitch together with more volatile organic materials), coal tar fractions, such as RT–5 and RT–9 (road tars), phenolic pitch, petroleum pitch, aromatic petroleum pitches, pyrobitumen, straight run, blown, cracked, aromatic and polymerized asphalts, extract bitumen, pine tar. Generally, 5 to 95 parts of pitch are used with 95 to 5 parts of epoxy resins.

Normally, there is also added 0.05 to 1 part of a curing agent per part of epoxy resin. Typical curing agents include diethylene triamine, triethylene tetramine, dicyandiamide, melamine, triethanolamine, N,N-dibutyl-1,3-propane diamine, amide from dimerized linoleic acid and ethylene diamide phosphoric acid, aluminum chloride and other Friedel-Crafts catalysts, oxalic acid, phthalic anhydride, etc.

There can also be added any of the conventional fillers, such as sand, coal, talc, mica, blast furnace slag, silica, clays, e.g., kaolin and bentonite, lignin, aluminum oxide, iron oxide, cement, silicon carbide, asbestos, diatomaceous earth, glass fibers. The filler can be from 1 to 90% of the total composition. Desirably, sufficient filler, preferably a silica filler such as sand, is used to make a mastic composition. Preferably, 25 to 85% of finely divided inorganic filler is employed. The filler is preferably less than 20 mesh (Tyler screen). The preferred fillers are finely divided mineral fillers, e.g., sand.

There can also be added a thixotropic agent such as Cab-O-Sil (a flame hydrated silica) or Bentone 34 (dimethyl dioctadecyl ammonium bentonite).

While the concrete pipe normally has the reinforcing wire therein, this can be omitted if desired.

The settable plastic, as used in the invention, is normally applied in a sticky or mastic condition.

In the examples the pitch can be omitted, and the filler can also be omitted so that only the epoxy resin is impinged on the interior pipe wall to form the facing. Preferably, however, an aromatic pitch, such as coal tar pitch, is included in the formulation and, as previously stated, there is also preferably included sand or equivalent finely divided mineral filler to impart a mastic consistency and abrasive resistant quality to the composition.

Epoxy ether resins, particularly bis-phenol A-epichlorhydrin, are the preferred resins, although other vic-epoxy resins, i.e., oxirane group containing resins, can be used, as previously indicated.

The present invention is useful in facing pipes of 4, 8, 12, 24 or 144 inches internal diameter.

In the specific example the facing layer had a thickness of about 100 mils. Usually, the facing layer prepared according to the invention has a thickness of between 100 and 125 mils. However, for some uses the thickness can be as thin as 10 mils and can be as much as 300 or 400 mils or even greater.

What is claimed is:

1. A process of forming an integral, continuous facing on the inner surface of a concrete pipe, comprising breaking up into particles a resinous composition consisting of an epoxy resin, a pitch-containing coal tar fraction and sufficient finely divided silica containing material to render the composition of mastic consistency and impinging said particles directly upon said inner surface with sufficient force to distort the surface of the pipe, impregnate said surface and penetrate said surface while the concrete is still in the wet, uncured stage and thereafter curing the concrete and setting the resin to form said integral facing.

2. A process according to claim 1 wherein the silica containing material is sand.

3. A process according to claim 1 wherein the resinous composition is impinged upon the inner surface of the concrete pipe by rapidly spinning and throwing the resin centrifugally against said surface.

4. A process according to claim 1 wherein the resinous composition is impinged upon the inner surface of the concrete pipe by spinning the resin centrifugally at a speed of at least 2000 r.p.m. and thereby throwing the resin centrifugally against said surface.

References Cited by the Examiner

UNITED STATES PATENTS

| 1,636,367 | 7/1927 | Illemann | 264—270 XR |
| 2,120,309 | 6/1938 | Carson | 264—79 XR |
| 3,080,253 | 3/1963 | Dietz et al. | 117—95 XR |

FOREIGN PATENTS 634,198   3/1950   Great Britain.

ROBERT F. WHITE, *Primary Examiner.*

ALEXANDER H. BRODMERKEL, *Examiner.*

J. A. FINLAYSON, *Assistant Examiner.*